(12) United States Patent
Boulard

(10) Patent No.: US 7,913,965 B2
(45) Date of Patent: Mar. 29, 2011

(54) CLAMP ASSEMBLY

(75) Inventor: Robert Boulard, Massillon, OH (US)

(73) Assignee: A.R.E. Accessories, LLC, Massillon, OH (US)

( * ) Notice: Subject to any disclaimer, the term of this patent is extended or adjusted under 35 U.S.C. 154(b) by 376 days.

(21) Appl. No.: 12/185,461

(22) Filed: Aug. 4, 2008

(65) Prior Publication Data

US 2008/0289158 A1 Nov. 27, 2008

Related U.S. Application Data

(62) Division of application No. 11/191,320, filed on Jul. 28, 2005, now Pat. No. 7,407,141.

(60) Provisional application No. 60/592,106, filed on Jul. 29, 2004.

(51) Int. Cl.
*A47B 96/06* (2006.01)

(52) U.S. Cl. ............. 248/231.61; 248/228.5; 248/316.4; 296/100.04; 296/100.17; 296/100.18; 403/87; 403/373

(58) Field of Classification Search ............. 248/231.61, 248/228.5, 229.14, 229.24, 689, 220.21, 248/220.22, 221.11, 222.13, 316.4, 230.5; 296/100.04, 100.17, 98, 100.18; 403/87, 403/373, 374.1
See application file for complete search history.

(56) References Cited

U.S. PATENT DOCUMENTS

| | | | |
|---|---|---|---|
| 4,547,092 A | 10/1985 | Vetter et al. | |
| 4,846,431 A * | 7/1989 | Pflieger | 248/228.4 |
| 4,969,784 A | 11/1990 | Yanke | |
| 5,251,950 A * | 10/1993 | Bernardo | 296/98 |
| 5,261,719 A | 11/1993 | Tucker | |
| 5,352,078 A * | 10/1994 | Nasu | 411/337 |
| 5,538,215 A | 7/1996 | Hosey | |
| 5,560,576 A | 10/1996 | Cargill | |
| 5,584,521 A * | 12/1996 | Hathaway et al. | 296/36 |
| 5,655,808 A * | 8/1997 | Wheatley | 296/100.17 |
| 5,765,902 A | 6/1998 | Love | |
| 6,547,311 B1 * | 4/2003 | Derecktor | 296/100.12 |
| 6,622,980 B2 | 9/2003 | Boucher et al. | |
| 6,814,388 B2 * | 11/2004 | Wheatley | 296/100.16 |
| 6,851,738 B1 | 2/2005 | Schmeichel et al. | |
| 7,407,141 B2 * | 8/2008 | Boulard | 248/231.61 |

* cited by examiner

*Primary Examiner* — Terrell Mckinnon
*Assistant Examiner* — Todd M. Epps
(74) *Attorney, Agent, or Firm* — Daniel A. Thomson; Emerson Thomson Bennett, LLC

(57) ABSTRACT

A clamp assembly is disclosed for a tonneau cover for a vehicle wherein the clamp assembly includes a plurality of spacers disposed therein to facilitate installation thereof on a variety of vehicle types and styles.

4 Claims, 12 Drawing Sheets

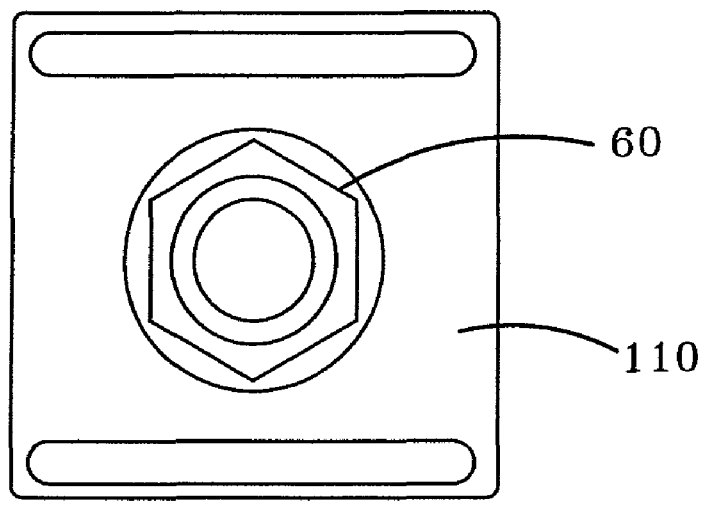
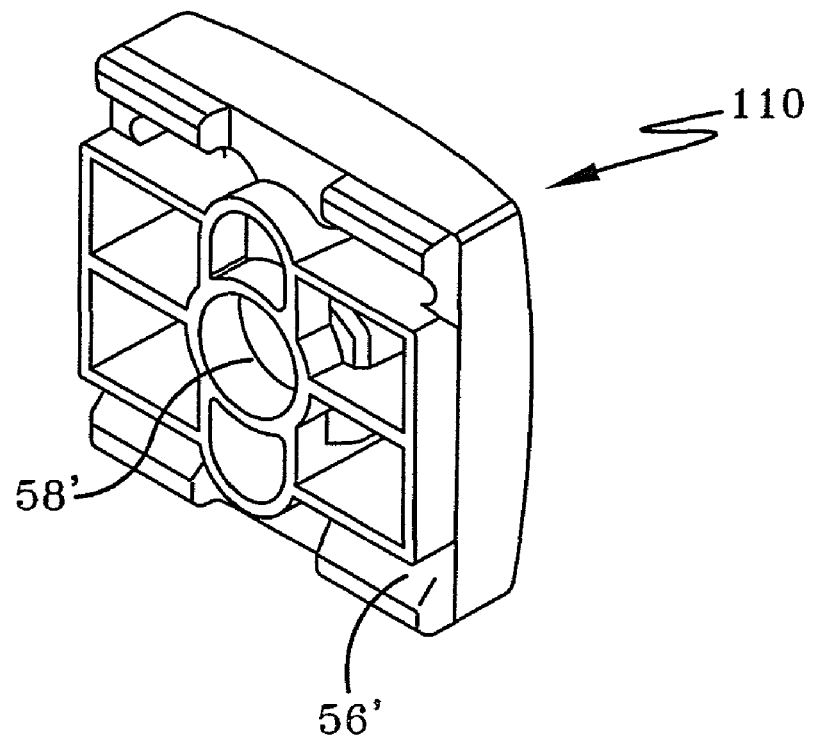
FIG-7

CLAMP ASSEMBLY

This divisional patent application claims priority from a utility patent application having Ser. No. 11/191,320, titled CLAMP ASSEMBLY, which was filed on Jul. 28, 2005 now U.S. Pat. No. 7,407,141, which claims priority to a provisional patent application Ser. No. 60/592,106, entitled CLAMP SYSTEM, filed Jul. 29, 2004. The invention relates to a clamp assembly and more particularly to a clamp assembly for a truck cap, tonneau cover, and the like for a vehicle wherein the clamp assembly includes a plurality of spacers to facilitate an adjustment of the clamp assembly.

BACKGROUND OF THE INVENTION

Field of the Invention

A number of accessories, such as truck caps, tonneau covers, light bars, utility boxes, and the like, can be added to a pickup truck or other vehicle for functional and decorative purposes. These accessories are typically secured to the truck by fasteners, aluminum extruded clamps, or "C" clamps.

Tonneau covers are typically made of a relatively soft, flexible fabric, approximately the size and shape of the cargo area to be covered. Alternatively, the cover can be constructed of a rigid and durable material such as fiberglass. The cover can include a mechanism disposed along the edge of the cover for securing the cover to the vehicle. In one known type of cover, holes are drilled in the vehicle and one portion of a snap is secured in each hole. The corresponding snap portions are secured about the perimeter of the cover. To secure the cover to the vehicle, the fabric is placed over the cargo area and the snaps are engaged.

In another known type of cover, a plurality of rails is clamped about the periphery of the cargo area. The rails include snaps, slots, or other features that engage corresponding features secured to the periphery of the cover.

The existing clamps can be problematic since the areas surrounding the drilled openings and any areas damaged by the clamps are susceptible to corrosion. Additionally, if a particular accessory is removed, the openings and the damaged areas remain in the truck bed side rails, thus detracting from the appearance of the vehicle.

It would be desirable to produce a clamp assembly which can be adapted to fit a variety of vehicles and wherein the clamp assembly militates against damage to the vehicle.

SUMMARY OF THE INVENTION

Consistent and consonant with the present invention, a clamp assembly which can be adapted to fit a variety of vehicles and wherein the clamp assembly militates against damage to the vehicle, has been discovered.

In accordance with one aspect of the present invention, a clamp assembly adapted to slidingly connect to an associated rail system includes a main body portion, the main body portion comprising a front side, a back side, multiple concave portions located on the back side, a top, a rounded bottom, an inset portion within which is inset an elongate aperture, a serrated portion on the back side, the serrated portion running along the length of the elongate aperture, multiple spacers, the spacers comprising a front side, a back side, a top, a rounded bottom, an open-ended slot, with the open end at the top, a first serrated portion on the front side of the spacers, the first serrated portion adapted to fit the serrated portion on the back side of the main body portion, a second serrated portion on the back side of the spacers, adapted to fit the first serrated portion on the front side of the spacers, multiple protuberant portions on the front side of the spacers, the protuberant portions adapted to fit in the concave portions on the back side of the main body portion, receiving portions on the back side of the spacers, the receiving portions adapted to receive the protuberant portions, a fastener, the fastener adapted to fit through the elongate apertures, and a clamp jaw, the clamp jaw comprising a front side, a back side, a bolt-receiving aperture, an outer top surface, a groove, the groove adapted to receive the second serrated portion, a pin, the pin adapted to enter the slot, and a rubber inlay, the rubber inlay fitting over the outer top surface.

In accordance with another aspect of the present invention, a clamp assembly includes a main body portion, the main body portion having an aperture adapted to receive a fastener and a fastener-receiving portion, the bolt-receiving portion having an anti-rotation portion.

In accordance with another aspect of the present invention, the assembly includes at least one spacer, the spacer having an open-ended slot, the spacer fitting between the main body portion and the fastener-receiving portion.

In accordance with another aspect of the present invention, the main body portion further includes an anti-rotation portion to coincide with the anti-rotation portion of the fastener-receiving portion.

In accordance with another aspect of the present invention, the fastener-receiving portion is a clamp jaw, and the anti-rotation portion of the main body portion is a serrated portion, and the anti-rotation portion of the clamp jaw is a groove designed to fit the serrated portion.

In accordance with another aspect of the present invention, the at least one spacer has a serrated portion on at least one side, the serrated portion designed to fit with the serrated portion of the main body portion and the groove of the clamp jaw.

In accordance with another aspect of the present invention, the assembly includes a selectively adjustable fastener, the fastener passing through the aperture of the main body portion, the slot of the spacer, and into the clamp jaw.

In accordance with another aspect of the present invention, the assembly includes a rail insert, the rail insert attached to the main body portion, the rail insert adapted to slidably engage at least one associated rail.

In accordance with another aspect of the present invention, the assembly includes protuberant portions, the protuberant portions located on the spacer, concave portions, the concave portions located on the back of the main body portion, and receiving portions on the back side of the spacer.

In accordance with another aspect of the present invention, the aperture in the main body portion is an elongate aperture.

In accordance with another aspect of the present invention, the assembly includes an inset portion in the main body portion and a cover plate, the cover plate fitting inside the inset portion.

In accordance with another aspect of the present invention, the main body portion and the spacers have a substantially rounded bottom.

In accordance with another aspect of the present invention, the assembly is adapted to be removed with an associated tonneau cover.

In accordance with another aspect of the present invention, a method for adjusting a clamp assembly on an associated rail system includes the steps of attaching a main body portion to the rail system by inserting a fastener through an aperture in the main body portion into a groove in the rail system, abutting a clamp jaw to the bottom of the rail system, and attaching the clamp jaw to the main body portion via a selectively adjustable fastener.

In accordance with another aspect of the present invention, the method includes inserting a spacer between the main body portion and the clamp jaw.

In accordance with another aspect of the present invention, prior to inserting a spacer between the main body portion and the clamp jaw, the method includes loosening the selectively adjustable fastener.

In accordance with another aspect of the present invention, inserting a spacer between the main body portion and the clamp jaw further includes inserting multiple spacers between the main body portion and the clamp jaw and tightening the selectively adjustable fastener.

In accordance with another aspect of the present invention, inserting a spacer between the main body portion and the clamp jaw, wherein the spacer has an open-ended slot and a serrated portion, further includes inserting the open-ended slot over the fastener, between the main body portion and the clamp jaw and aligning the serrated portion of the spacer with a serrated portion on the main body portion.

In accordance with another aspect of the present invention, the method further includes removing an associated tonneau cover and resting the tonneau cover on an associated surface, wherein the bottom of the main body portion is contacting the associated surface, thereby holding the tonneau cover above the associated surface.

In accordance with another aspect of the present invention, the clamp jaw has a rubber inlay, which includes a center portion that is angled at approximately a 45 degree angle with respect to the clamp jaw and multiple ribs on the surface of the inlay.

DESCRIPTION OF THE DRAWINGS

The above, as well as other advantages of the present invention will become readily apparent to those skilled in the art from the following detailed description of at least one embodiment when considered in the light of the accompanying drawings in which:

FIG. 7 is a perspective view of a T-nut;

DESCRIPTION OF THE INVENTION

Figure 1:
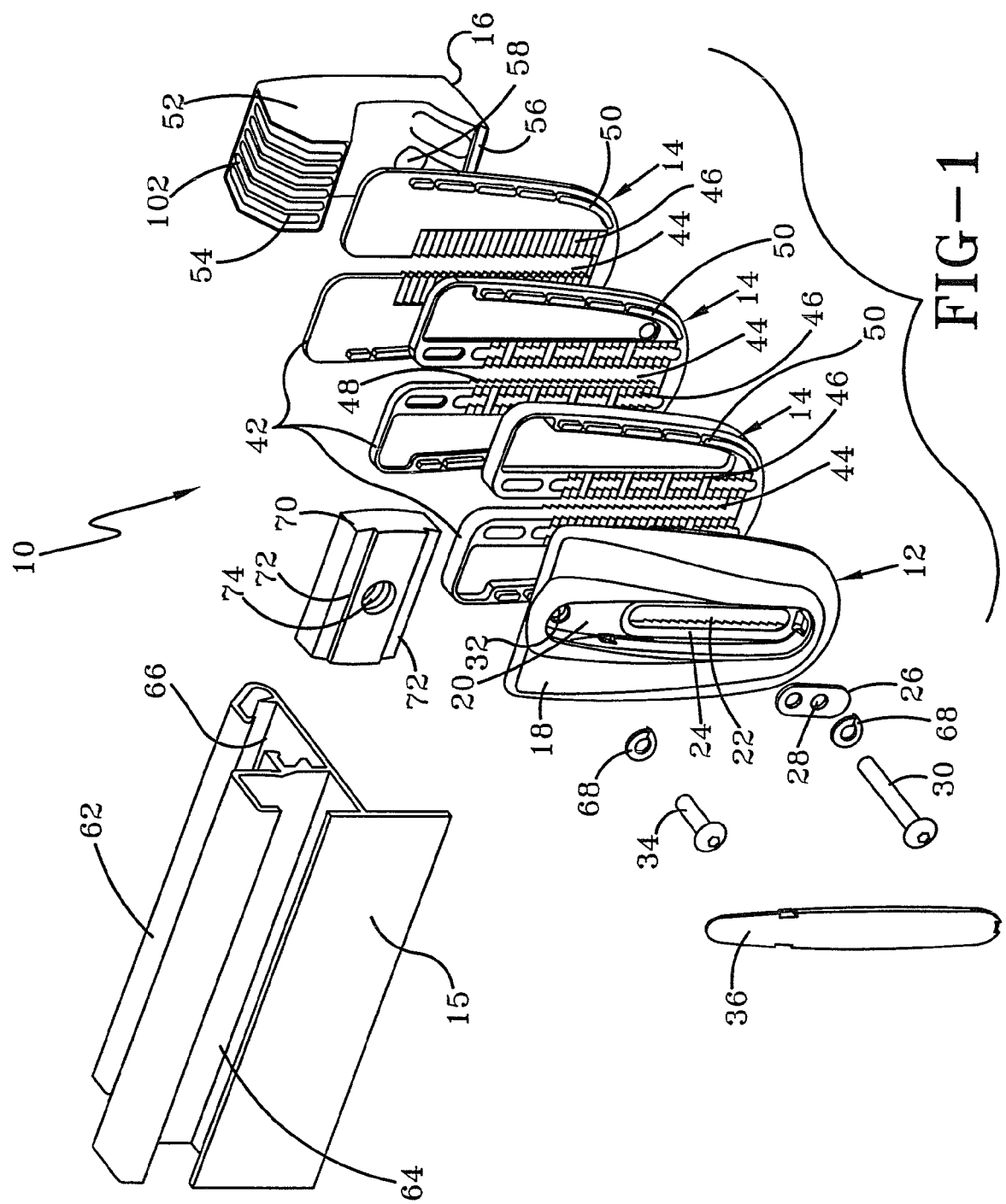
FIG. 1 is an exploded perspective view of a clamp assembly, along with a cooperating rail system, according to one embodiment of the invention.
Figure 2:
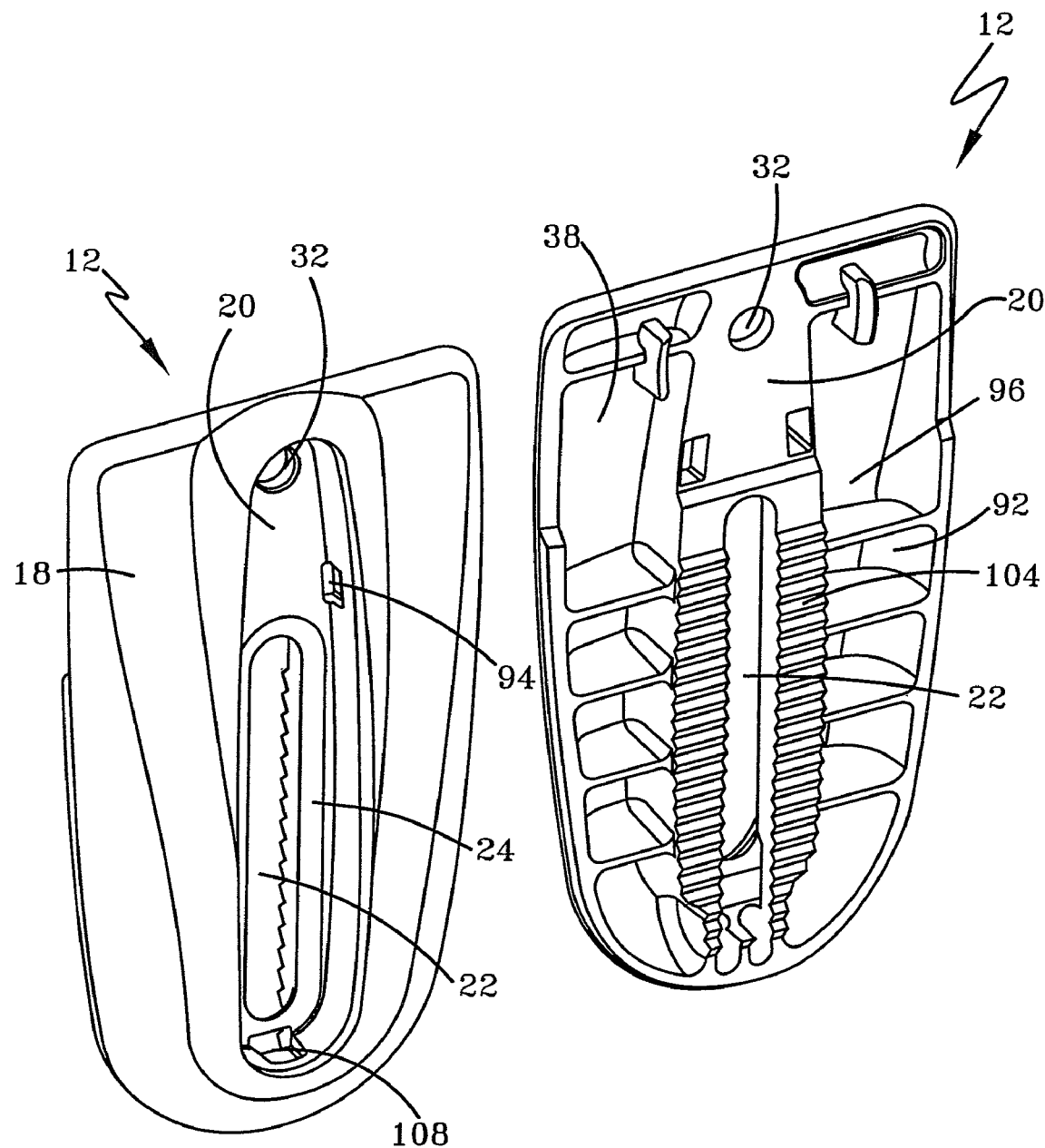
FIG. 2 is a perspective view of the front and back sides of the main body portion of the clamp assembly.
Figure 3:
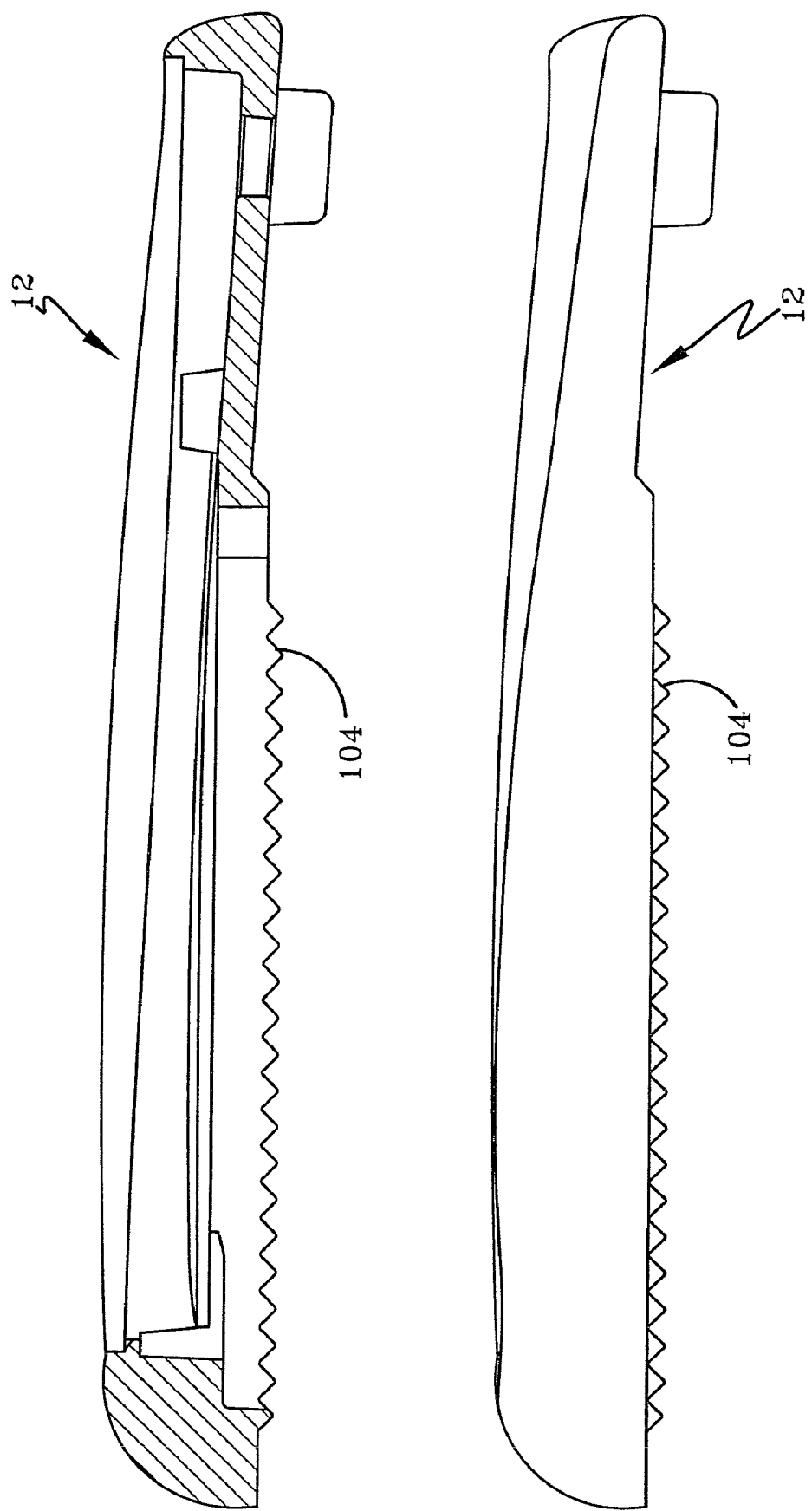
FIG. 3 is a side and sectional view of the main body portion of the clamp assembly.
Figure 4:
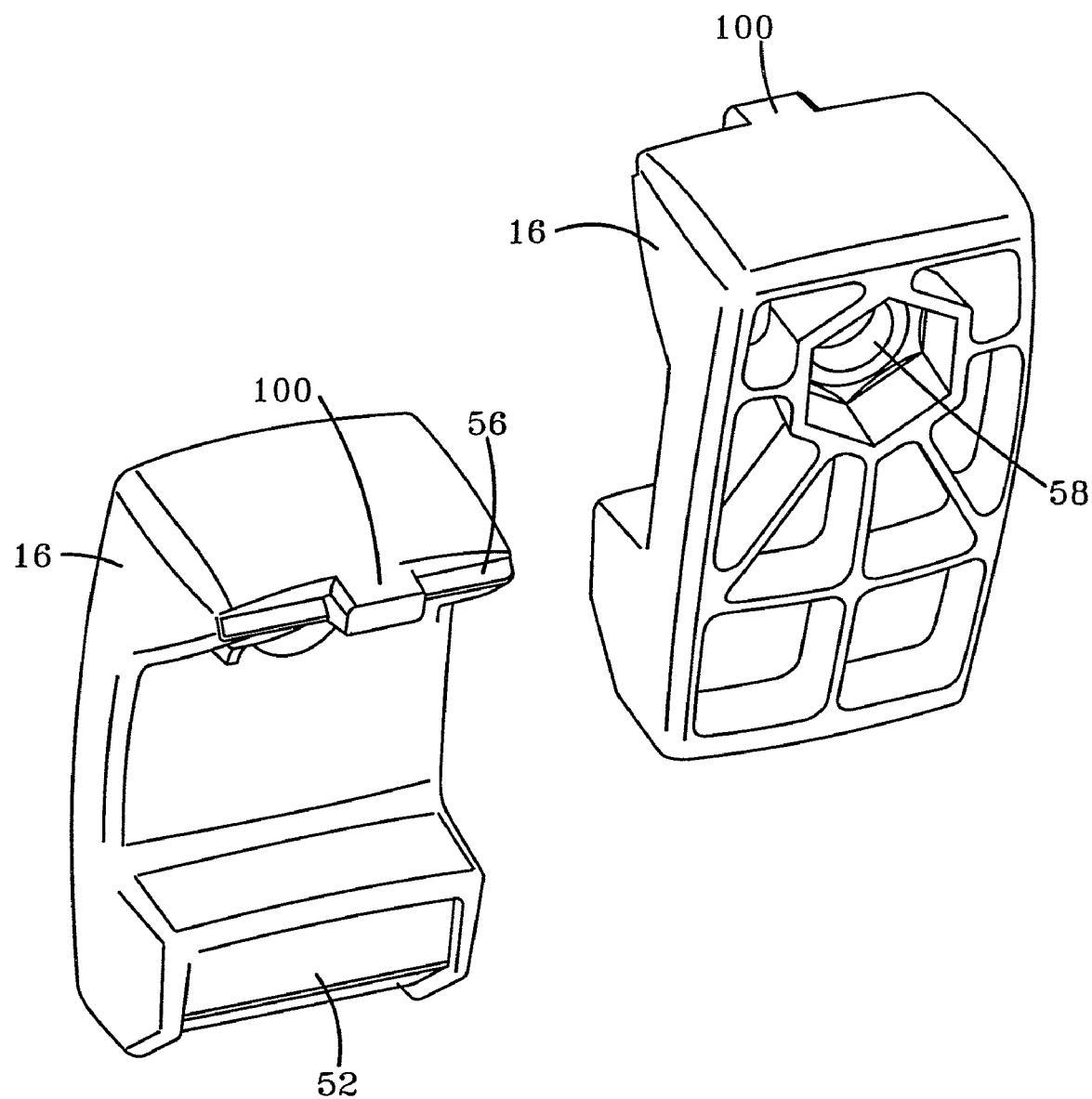
FIG. 4 is a perspective view of the front and back of the clamp jaw without the rubber inlay, and without the hex nut.
Figure 5:
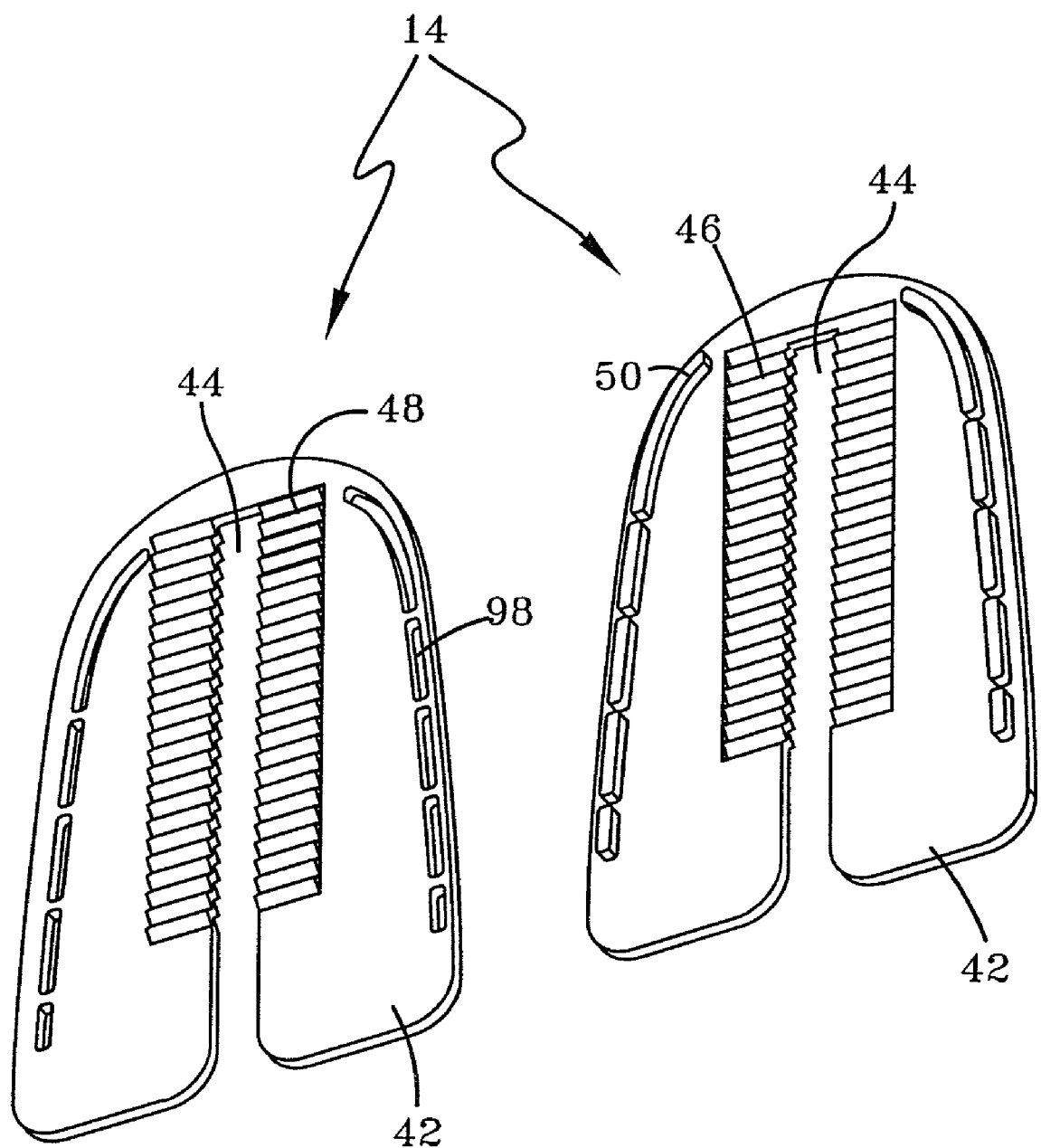
FIG. 5 is a perspective view of the front and back of one embodiment of the spacer.
Figure 6:
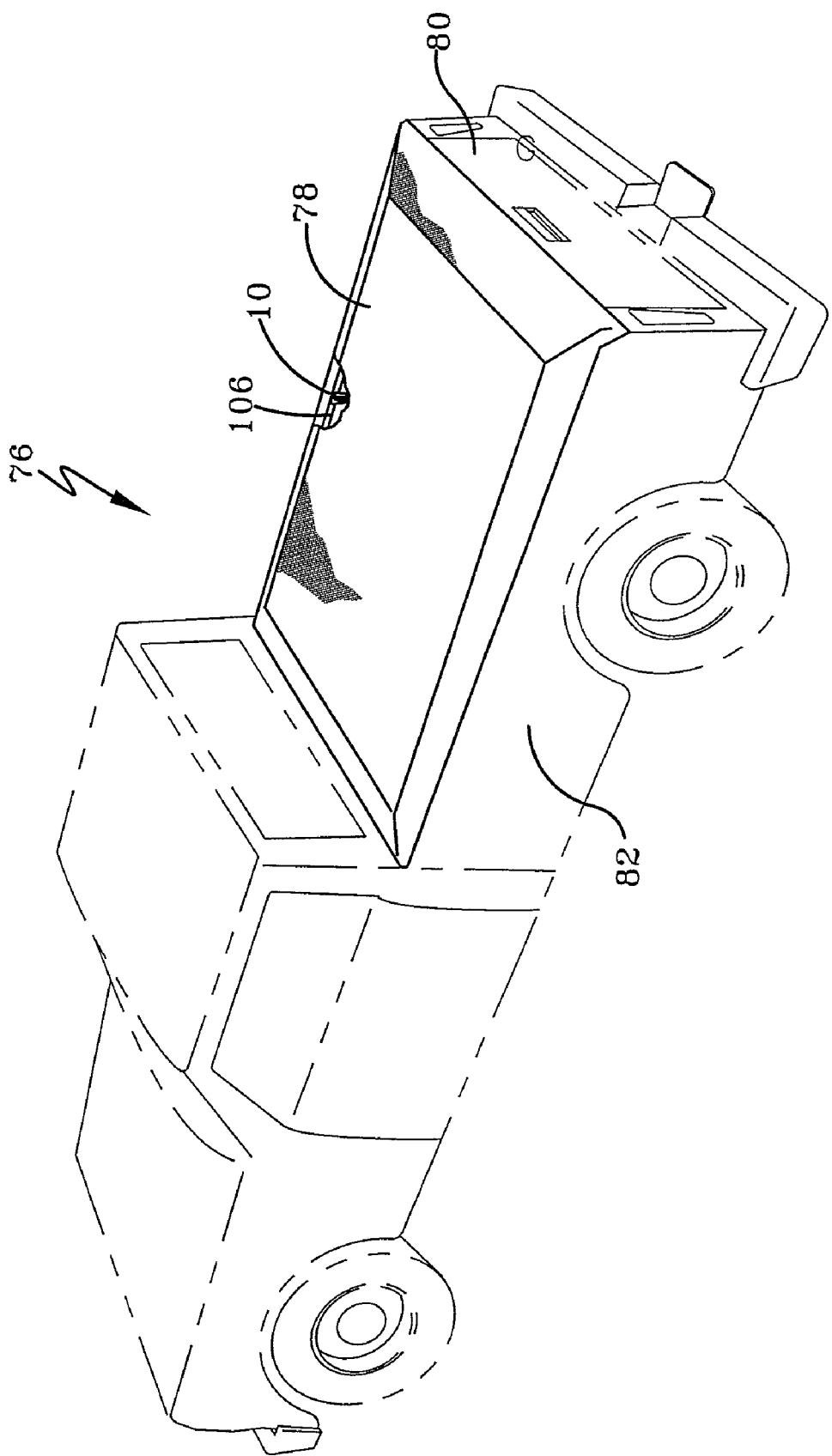
FIG. 6 is a perspective view of a vehicle with a tonneau cover in place.
Figure 8:
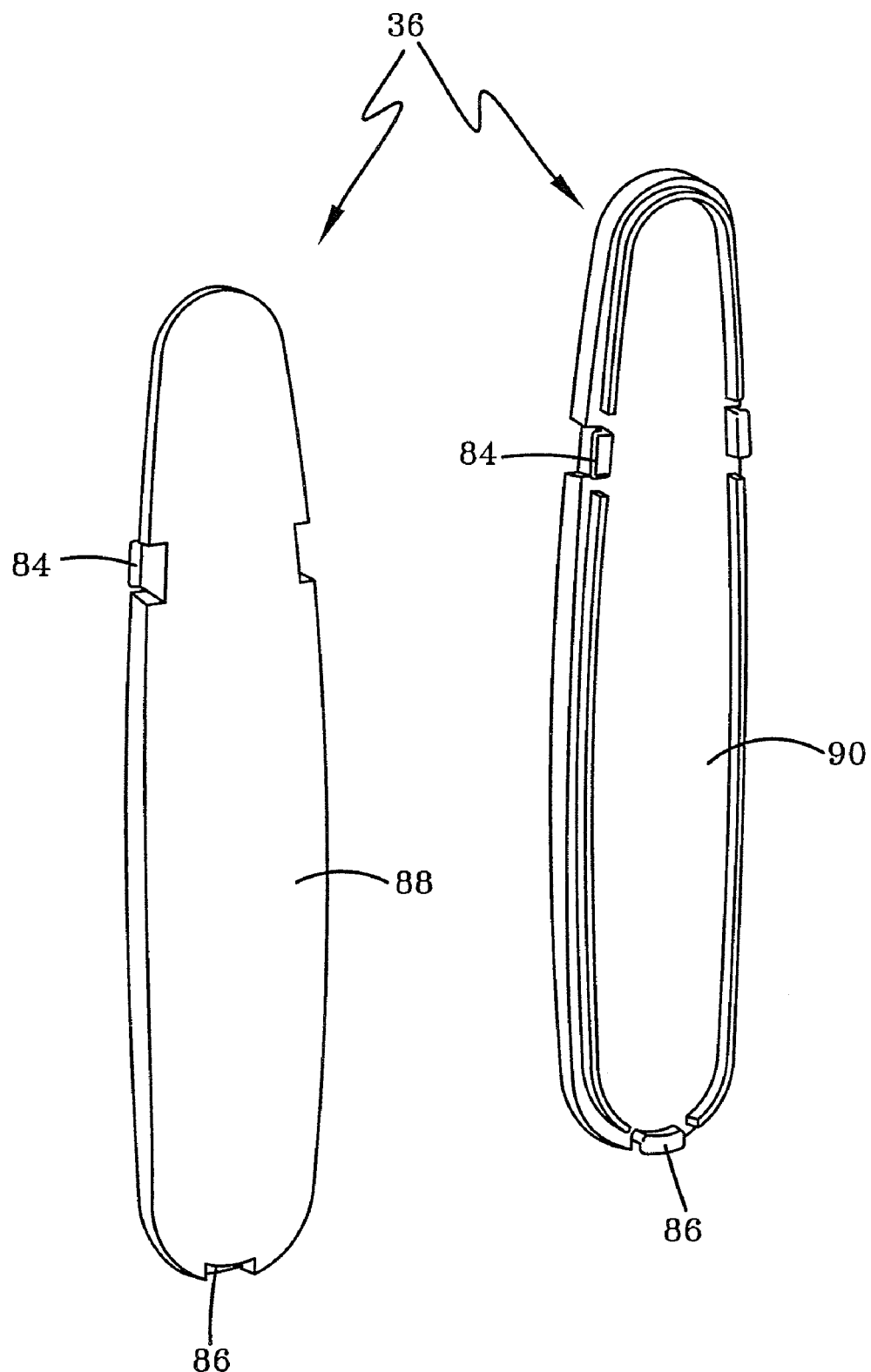
FIG. 8 is a perspective view of the front and back of the cover plate.
Figure 9:
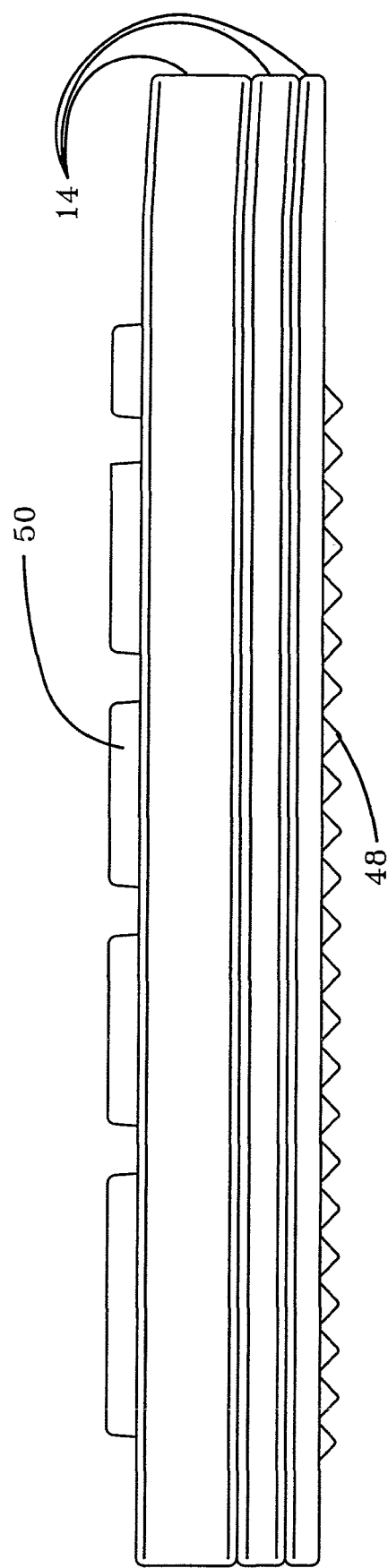
FIG. 9 is a side view of three connected spacers.

The following detailed description and appended drawings describe and illustrate various exemplary embodiments of the invention. The description and drawings serve to enable one skilled in the art to make and use the invention, and are not intended to limit the scope of the invention in any manner.

With reference now to FIGS. 1-10, the figures depict a clamp assembly 10 according to one embodiment of the invention. The clamp assembly 10 includes a main body portion 12, spacers 14, and a clamp jaw 16. The main body portion 12 has a first side or front side 18. An inset portion 20 is formed in the front side 18. An elongate aperture 22 is formed at a bottom portion of the inset portion 20 and is surrounded by an annular surface 24. The annular surface 24 is adapted to receive a bolt plate 26 therein. The elongate aperture 22 allows the fastener 30 and the clamp jaw 16 to be adjusted to the proper height. The bolt plate 26 includes a pair of apertures 28 adapted to receive a threaded fastener 30 therein. An aperture 32 is formed in the upper portion of the inset portion 20 and is adapted to receive a threaded fastener 34 therein. The inset portion 20 receives a snap-in cover plate 36 to hide the threaded fasteners 30, 34 after installation. The cover plate 36 has a front side 88, a back side 90, top connecting tabs 84, and bottom connecting tab 86. Connecting tabs 84, 86 snap into tab receiving portions 94, 108. A back side 38 of the main body portion 12 includes a serrated portion 104 extending outwardly therefrom.

The spacers 14 are generally U-shaped having a pair of upright arms 42 with a slot 44 disposed therebetween. As shown in the drawings, spacers 14 having different thicknesses can be used as desired. The slot 44 of the spacers 14 is aligned with the elongate aperture 22 of the main body portion 12 to allow the threaded fastener 30 to pass therethrough. A first serrated portion 46 is formed on a first side of the spacers 14 on each of the arms 42. A second serrated portion 48 is formed on a second side of the spacers 14 on each of the arms 42. The first serrated portion 46 of the spacers 14 is adapted to mesh with the serrated portion 104 of the main body portion 12 or the second serrated portion 48 of an adjacent spacer 14. A protuberant portion 50 is formed on a periphery of the first side of each of the spacers 14 and is adapted to be received in a concave portion 92 formed in the main body portion 12 or receiving portions 98 on an adjacent spacer 14 (although it is to be understood that on some embodiments of the spacers 14, in particular the thinner spacers 14, there are no receiving portions 98). The protuberant portion 50 of the first spacer 14 is received within concave portion 92 of the main body portion 12, thereby preventing slipping.

The clamp jaw 16 is generally C-shaped. The top portion includes an outer surface 52 adapted to abut an undersurface of a truck rail (not shown). In the embodiment shown, a rubber inlay 54 is provided to be disposed between the outer surface 52 and the undersurface of the truck rail. A groove 56 is provided at a bottom portion of the clamp jaw 16 and cooperates with the second serrated portion 48 of one of the spacers 14, or the serrated portion 104 of the main body portion 12, to militate against rotation or spinning of the clamp jaw 16. An aperture 58 is formed in the clamp jaw 16 to permit the fastener 30 to pass therethrough and be joined with a nut 60. The clamp jaw 16 also has a pin 100 that is adapted to fit within the slot 44 and/or elongate aperture 22. The pin 100, like the groove 56 helps prevent rotation or spinning of the clamp jaw 16. If additional spacers 14 are needed, the fastener 30 is loosened, and the clamp jaw 16 is moved far enough away from the main body portion 12 to allow insertion of an additional spacer(s) 14. The spacer 14, using slot 44 is slid around the fastener 30 and the protuberant portions 50 of the second spacer 14 are fit within the receiving portions 98 of the first spacer 14, and the groove 56 of the clamp jaw 16 is fit against the second serrated portion 48 on the second spacer 14. The fastener 30 is then re-tightened until the clamp assembly 10 is securely fastened.

In use, the clamp assembly 10 cooperates with an extruded rail system 62 to be fastened to the truck rail 106. When the clamp assembly 10 is used with a truck cap (not shown), the clamp assembly 10 may be adapted to cooperate with a rail portion of the truck cap. The clamp assembly 10 is assembled by placing the rail 62 on top of the truck rail 106. The outer surface 52 and the rubber inlay 54 are held adjacent the undersurface of the truck rail 106. The fastener 34 is inserted through washer 68, and then through the aperture 32 to be received in a rail insert 70 disposed in a first slotted portion 64 of the rail 62. The rail insert 70 allows for easy movement of the clamp assembly 10 along the slotted portion 64. It is to be understood that the clamp assembly 10 can either be slidably engageable with the rail system or fastened in place. The fastener 30 is inserted through one of the apertures 28 formed in the bolt plate 26, the elongate aperture 22, the aperture 58 formed in the clamp jaw 16, and received in the nut 60. The desired number of spacers 14 is placed between a downwardly extending rail flange 15 of the tonneau cover 78 or truck cap (not shown) and a corresponding flange (not shown) of the truck rail 106. In this way, the tonneau cover 78 or truck cap (not shown) may be appropriately centered on the truck bed 82, and secured to the truck bed 82. The slot 44 allows the spacers 14 to be inserted and removed as desired without completely disassembling the clamp assembly 10. Once the desired number of spacers 14 has been inserted, the clamp assembly 10 can be positioned as desired and the fasteners 30, 34 tightened to hold the clamp assembly 10 in place. In one embodiment of the invention, a plurality of the clamp assemblies 10 is used to hold the rail 62 in place on the truck rail 106. Snaps or other conventional fasteners (not shown) disposed in a second slotted portion 66 of the rail 62 cooperate with snaps or other conventional fasteners (not shown) in the tonneau cover 78 to hold the tonneau cover 78 in place.

After installation, the clamp assembly 10 provides a safe and aesthetically pleasing clamp assembly 10 since the fasteners 30, 34 are hidden from view by the cover plate 36. Additionally, the rubber inlay 54 provided on the outer surface 52 of the clamp jaw 16 militates against skidding, sliding, or moving of the clamp assembly 10. In this embodiment, the rubber inlay 54 also has ribs 102 along the surface in order to further prevent skidding, sliding, or moving of the clamp assembly 10. Additionally, the serrated portions 104, 46, 48, groove 56, the protuberant portions 50, and cooperating receiving portions 98 militate against a relative movement between the main body portion 12, the spacers 14, and the clamp jaw 16. The spacers 14 allow the clamp assembly 10 to be used on a variety of vehicles 76 having truck rails 106 of varying widths. It is to be understood that as may spacers 14 can be used as desired to accommodate the different widths of truck rails 106.

Figure 10:
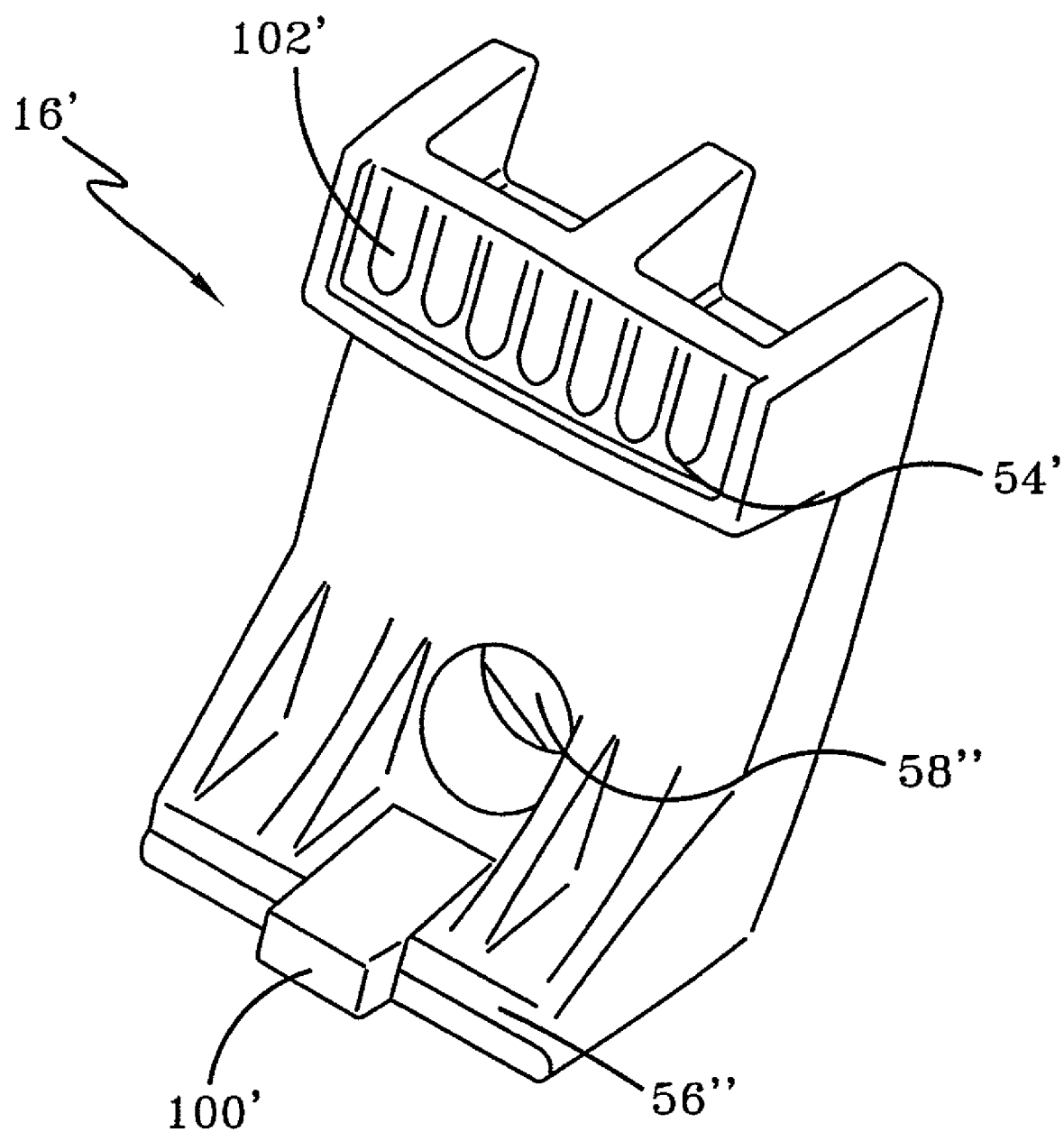
FIG. 10 is a perspective view of another embodiment of the clamp jaw.

With reference now to FIGS. 7 and 10, FIG. 7 shows a T-nut 110, which has a similar function to the clamp jaw 16. T-nut 110 has a groove 56' for preventing rotation, and aperture 58' for receiving the fastener 30. FIG. 10 shows another embodiment of the clamp jaw 16', which, for this particular embodiment, is modified for a specific vehicle application. Clamp jaw 16' has a groove 56" and a pin 100' for preventing rotation, aperture 58" for receiving the fastener 30, and rubber inlay 54' for preventing slipping.

In this embodiment, the serrated portions 104, 46, 48 have individual teeth that engage with each other to form a slip-free connection. It is to be understood, however, that the serrated portions 104, 46, 48 are merely embodiments of the invention and are not intended to limit the invention in any manner. It is to be understood that any means of preventing rotation could be used, as long as chosen using sound engineering judgment. For example, the following anti-rotation devices could be used—pins and holes, flexible press fit, clips, and any other male/female combination devices. It is also to be understood that the placement of the serrated portions is not intended to limit the invention. The serrated portions could be located anywhere on the main body portion 12 and spacers 14, as long as chosen using sound engineering judgment. For example, the serrated portions could be located on the inside of the slots.

The attachment of the clamp assembly 10 allows for easy removal of the tonneau cover 78, and allows the clamp assembly 10 to remain attached to the tonneau cover 78. In this embodiment, the clamp assembly 10 has a rounded bottom, so that the tonneau cover 78 can be placed on the ground using the clamp assembly 10 as support. So, when the tonneau cover 78 is removed and placed on the ground, the clamp assemblies 10 hold the tonneau cover 78 up off of the ground.

Figure 11:
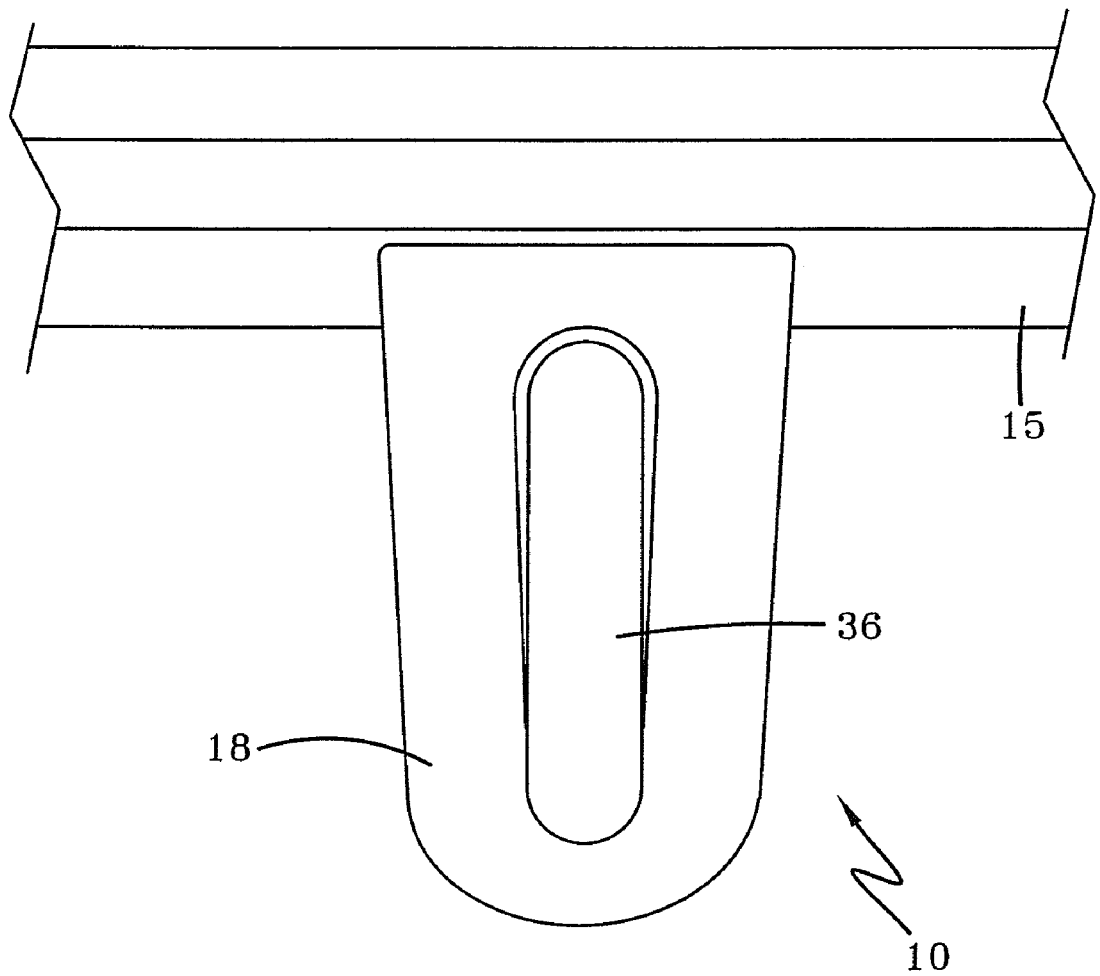
FIG. 11 is a perspective view of the clamp assembly attached to the rail system; and, FIG. 12 is a side view of the clamp assembly attached to the rail system.
Figure 12:
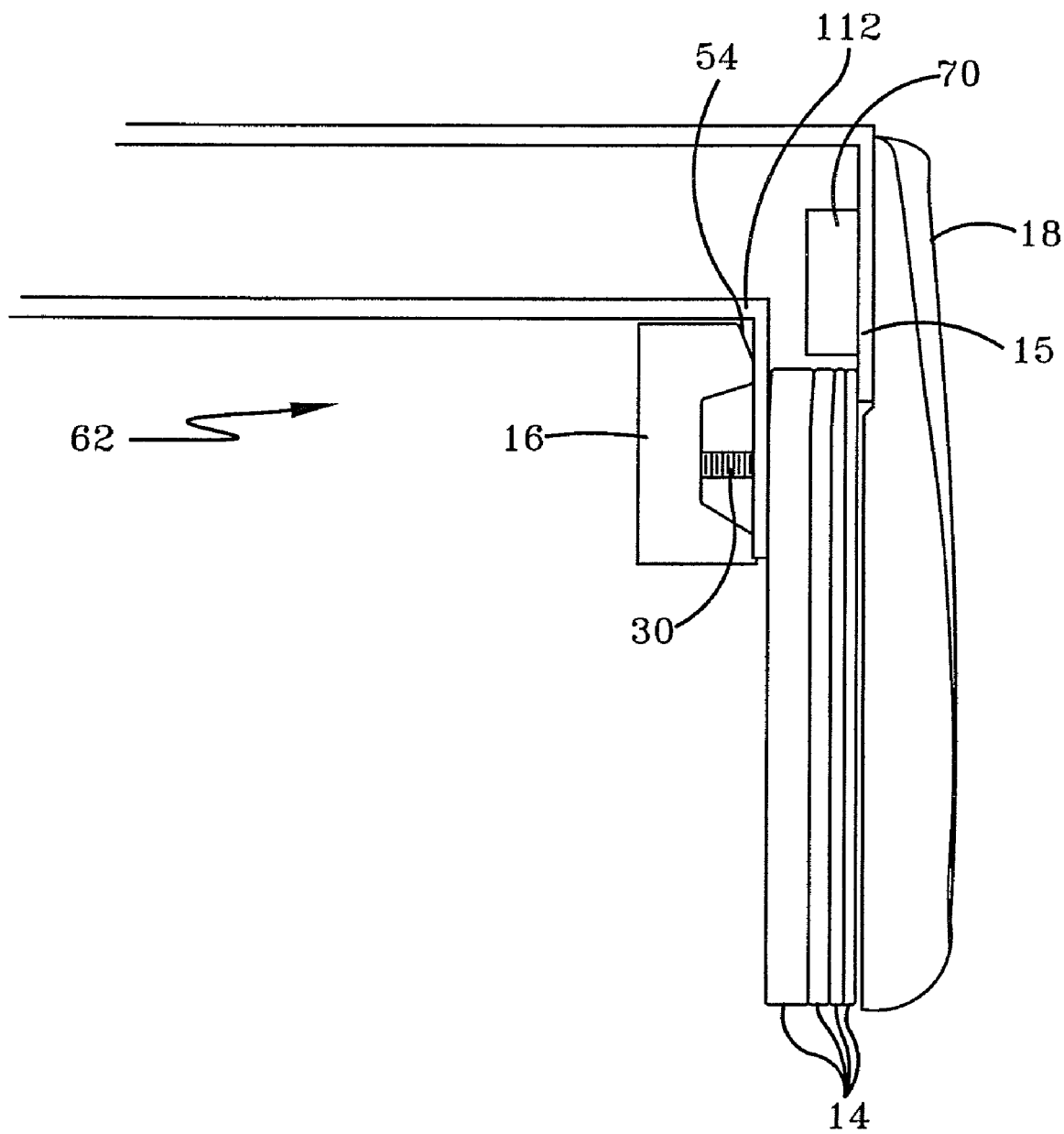

With reference now to FIGS. 11 and 12, the clamp assembly 10 is shown attached to the rail system 62. In this particular embodiment, the clamp assembly 10 is fixedly attached to the rail flange 15. FIG. 12 shows the clamp assembly 10 with multiple spacers 14. In one embodiment, the clamp jaw 16 has an angled outer surface 52 and rubber inlay 54. This angle allows the clamp jaw 16 to fit more securely within the rail system 62. As can be seen in FIG. 12, the rubber inlay 54 fits within bend 112 in the rail system 62. In this particular embodiment, the angle is approximately 45 degrees, but it is to be understood that any angle, chosen using sound engineering judgment, could be used.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for adjusting a clamp assembly on an associated rail system, the method comprising the steps of:
    attaching a main body portion to the rail system by inserting a fastener through an aperture in the main body portion into a groove in the rail system;
    abutting a clamp jaw to the bottom of the rail system;
    inserting an open-ended slot of a spacer over the fastener, between the main body portion and the clamp jaw;
    aligning a serrated portion of the spacer with a serrated portion on the main body portion; and,
    attaching the clamp jaw to the main body portion via a selectively adjustable fastener.

2. The method of claim 1, wherein abutting a clamp jaw to the bottom of the rail system comprises the steps of:
    first, abutting a clamp jaw to the bottom of the rail system; and,
    then, loosening the selectively adjustable fastener.

3. The method of claim 2, wherein inserting an open-ended slot of a spacer over the fastener, between the main body portion and the clamp jaw further comprises the step of:
    inserting the open-ended slots of multiple spacers over the fastener, between the main body portion and the clamp jaw; and,
    tightening the selectively adjustable fastener.

4. The method of claim 1 further comprising the steps of:
    removing an associated tonneau cover; and,
    resting the tonneau cover on an associated surface, wherein the bottom of the main body portion is contacting the associated surface, thereby holding the tonneau cover above the associated surface.

* * * * *